(12) United States Patent
Nanahara et al.

(10) Patent No.: US 8,659,230 B2
(45) Date of Patent: Feb. 25, 2014

(54) ILLUMINATION CONTROL SYSTEM

(75) Inventors: Atuo Nanahara, Kyoto (JP); Shinji Matsuda, Chiba (JP)

(73) Assignee: Panasonic Corporation, Osaka (JP)

( * ) Notice: Subject to any disclaimer, the term of this patent is extended or adjusted under 35 U.S.C. 154(b) by 111 days.

(21) Appl. No.: 13/495,070

(22) Filed: Jun. 13, 2012

(65) Prior Publication Data

US 2012/0319596 A1  Dec. 20, 2012

(30) Foreign Application Priority Data

Jun. 16, 2011 (JP) ................... 2011-134409
Jun. 16, 2011 (JP) ................... 2011-134410

(51) Int. Cl.
*H05B 37/02* (2006.01)

(52) U.S. Cl.
USPC .......................................................... 315/153

(58) Field of Classification Search
USPC ................................................ 315/149–159
See application file for complete search history.

(56) References Cited

U.S. PATENT DOCUMENTS

| | | | | |
|---|---|---|---|---|
| 2012/0146518 A1* | 6/2012 | Keating et al. | ............... | 315/153 |
| 2012/0161643 A1* | 6/2012 | Henig et al. | ............... | 315/151 |
| 2012/0326611 A1* | 12/2012 | Nanahara et al. | ............. | 315/151 |
| 2013/0038217 A1* | 2/2013 | Askin et al. | ................. | 315/151 |

FOREIGN PATENT DOCUMENTS

| | | |
|---|---|---|
| JP | H11-283406 | 10/1999 |
| JP | 2002-134282 | 5/2002 |
| JP | 2002-289377 | 10/2002 |
| JP | 3858502 | 12/2006 |
| JP | 3906512 | 4/2007 |
| JP | 2009-238454 | 10/2009 |
| JP | 2009-238526 | 10/2009 |
| JP | 2009-238548 | 10/2009 |
| JP | 2009-266502 | 11/2009 |
| JP | 2009-283183 | 12/2009 |
| JP | 2011-49004 | 3/2011 |

* cited by examiner

*Primary Examiner* — Jany Richardson

(74) *Attorney, Agent, or Firm* — Renner, Otto, Boisselle & Sklar, LLP

(57) ABSTRACT

An illumination control system includes: illumination apparatuses having respective addresses and perform a dimming control in response to a dimming signal inputted from an outside, and an illumination control terminal which has an imaging device, a capturing range of which is set to include illumination ranges of the illumination apparatuses. The illumination control terminal segments an image captured by the imaging device into a plurality of areas so that the areas correspond to the illumination ranges, detects a person based on the captured image, determines a segmented area in which the person is present if the person has been detected and performs dimming control on an illumination apparatus corresponding to the determined segmented area.

6 Claims, 8 Drawing Sheets

ILLUMINATION CONTROL SYSTEM

FIELD OF THE INVENTION

The present invention relates to an illumination control system.

BACKGROUND OF THE INVENTION

Conventionally, there have been provided illumination control systems to which human detection technique and brightness detection technique using image sensors such as a CCD (Charge Coupled Device) or a CMOS (Complementary Metal Oxide Semiconductor) is applied (see, e.g., Japanese Patent Application Publication No. 2002-289377 (JP2002-289377A), paragraphs [0034] to [0038] and FIGS. 1 to 3). Such an illumination control system includes a TV camera as a brightness detection sensor, an operation control device implemented as a PC terminal or the like, and a plurality of illumination apparatuses in which outputs from light sources are automatically controlled in response to a dimming signal that is outputted based on image data inputted to the operation control device.

This illumination control system captures an image of an illuminated space by using the TV camera, segments the captured image into a plurality of areas and detects the presence or absence of a person in each segmented area, thus performing an illumination control.

Although the illumination control system disclosed in JP2002-289377A performs the illumination control by detecting the presence or absence of a person in each segmented area, there is no relationship between each segmented area and a range of illumination provided by each illumination apparatus, and thus a suitable illumination environment cannot be necessarily created.

SUMMARY OF THE INVENTION

In view of the above, the present invention provides an illumination control system capable of creating a suitable illumination environment.

In accordance with an aspect of the present invention, there is provided an illumination control system including: a plurality of illumination apparatuses which have respective unique addresses and individually perform a dimming control in response to a dimming signal inputted from an outside, and an illumination control terminal which has an imaging device, a capturing range of which is set to include illumination ranges of the illumination apparatuses.

The illumination control terminal segments an image captured by the imaging device into a plurality of areas so that the areas correspond to the illumination ranges of the respective illumination apparatuses, determines based on the captured image whether a person is present or not, determines a segmented area in which the person is present if the person has been detected and performs dimming control on an illumination apparatus corresponding to the determined segmented area.

The illumination control terminal may set an area, in which the illumination ranges of the plurality of illumination apparatuses overlap with each other, as an overlapping area different from the segmented areas.

The illumination control terminal may have a function of measuring illuminance distributions in the captured image with respect to the segmented areas, and is preferably configured to, if a person has been detected, calculate respective average illuminances of remaining segmented areas other than the segmented area where the corresponding person is present and perform a feedback-control on the corresponding illumination apparatuses so that the average illuminances become same as respective preset target values.

In accordance with another aspect of the present invention, there is provided an illumination control system including: a plurality of illumination apparatuses which have respective unique addresses and individually perform a dimming control in response to a dimming signal inputted from an outside, and an illumination control terminal which has an imaging device, a capturing range of which is set to include illumination ranges of the illumination apparatuses and which detects based on an image captured by the imaging device whether a person is present and performs a dimming control on an illumination apparatus corresponding to a location of a detected person if the person has been detected.

The illumination control terminal has an illumination area recognition mode that is set in response to a trigger signal inputted from the outside and is configured to, if the illumination control terminal is set to the illumination area recognition mode, obtain a reference image by putting all of the illumination apparatuses in an identical operating state, obtain comparison images by sequentially switching an operating state of each of the plurality of illumination apparatuses to a different operating state one by one and compare the comparison images with the reference image, thus recognizing illumination areas of the respective illumination apparatuses.

The illumination control terminal is preferably configured such that, for an illumination area in which the illumination ranges of the plurality of illumination apparatuses overlap with each other, relevant illumination apparatuses are set to correspond to the illumination area.

The present invention is advantageous in that an illumination control system capable of creating a suitable illumination environment can be provided.

BRIEF DESCRIPTION OF THE DRAWINGS

The objects and features of the present invention will become apparent from the following description of embodiments, given in conjunction with the accompanying drawings, in which:

FIGS. 1A and 1B show an illumination control system in accordance with a first embodiment of the present invention, wherein FIG. 1A is a schematic configuration diagram, and FIG. 1B is a layout diagram;

DETAILED DESCRIPTION OF THE EMBODIMENTS

Figure 1A:
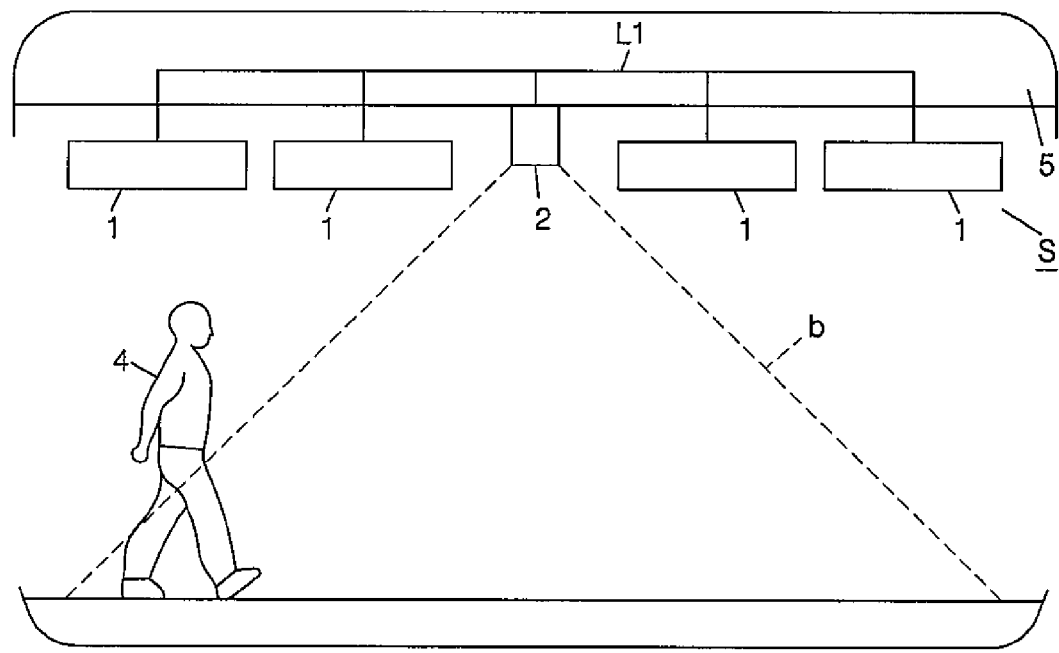
Figure 1B:
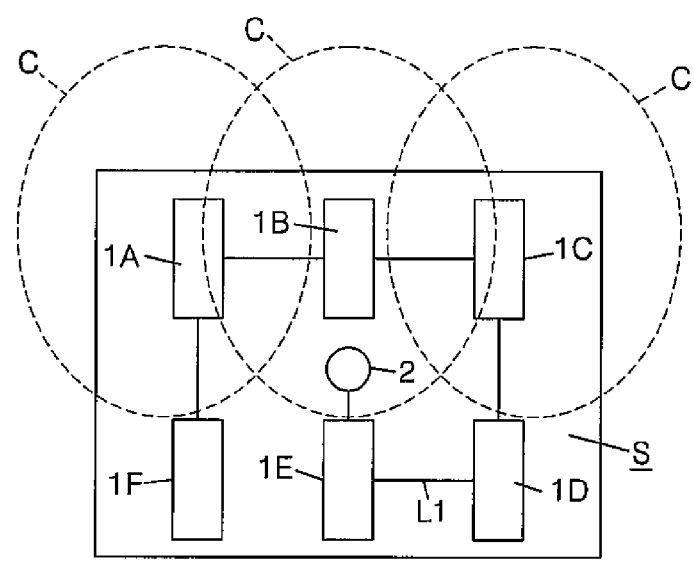

Hereinafter, an embodiment of an illumination control system in accordance with a first embodiment of the present invention will be described with reference to FIGS. 1A to 6B. The illumination control system S in accordance with the present embodiment may be installed on a ceiling 5, as shown in FIGS. 1A and 1B to detect a person inside 4 who enters a sensing area b of an image sensor 211 provided in an illumination control terminal 2 (see FIG. 2B) and to automatically turn on illumination apparatuses 1.

The illumination control system S in accordance with the present embodiment includes a plurality of (six in FIG. 1B) illumination apparatuses 1 and the illumination control terminal 2 connected to the illumination apparatuses 1 via a communications line L1. Further, in the following description, when there is a need to distinguish individual illumination apparatuses 1, they are denoted as illumination apparatuses 1A to 1F to distinguish from one another.

Figure 2A:
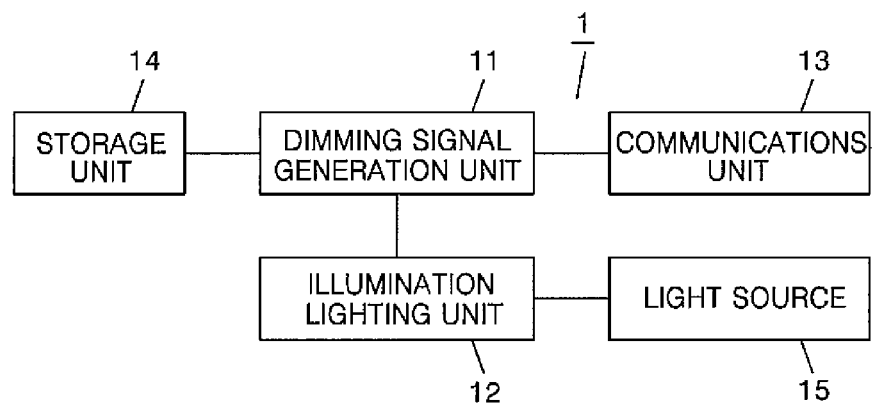
FIG. 2A is a block diagram showing an illumination apparatus forming a part of the illumination control system.

FIG. 2A is a block diagram showing an illumination apparatus 1, wherein the illumination apparatus 1 includes a dimming signal generation unit 11, an illumination lighting unit 12, a communications unit 13, a storage unit 14, and a light source 15 as principal components.

The dimming signal generation unit 11 is implemented as, e.g., a processor such as a microcomputer or a DSP (Digital Signal Processor) and has a function of generating a dimming signal based on a communications signal received from the illumination control terminal 2 via the communications unit 13. Further, the dimming signal generation unit 11 also has a function of determining whether an address included in the communications signal from the illumination control terminal 2 is identical to an address previously set in the dimming signal generation unit 11 itself.

The illumination lighting unit 12 has a function of dimmingly turning on the light source 15 based on the dimming signal generated by the dimming signal generation unit 11.

The communications unit 13 has a function of performing one-to-one communications with a communications unit 23 in the illumination control terminal 2 via the communications line L1. Further, the communications unit 13 is not limited to wired communications using the communications line L1, and may use power line communications or wireless communications as long as each illumination apparatus 1 and the illumination control terminal 2 can perform one-to-one communications with each other.

The storage unit 14 is implemented as, e.g., a non-volatile device such as an EEPROM (Electrically Erasable Programmable Read-Only Memory), a flash ROM or the like. The storage unit 14 stores unique addresses allocated to the respective illumination apparatuses 1.

The light source 15 is implemented as, e.g., an LED (Light Emitting Diode) and performs a turn-on operation, a turn-off operation, or the adjustment of a dimming level by using a dimming control performed by the illumination lighting unit 12. Further, a method of turning on the light source 15 to a desired brightness by performing a dimming control corresponds to a conventionally well-known technique, and thus a detailed description thereof is omitted.

Figure 2B:
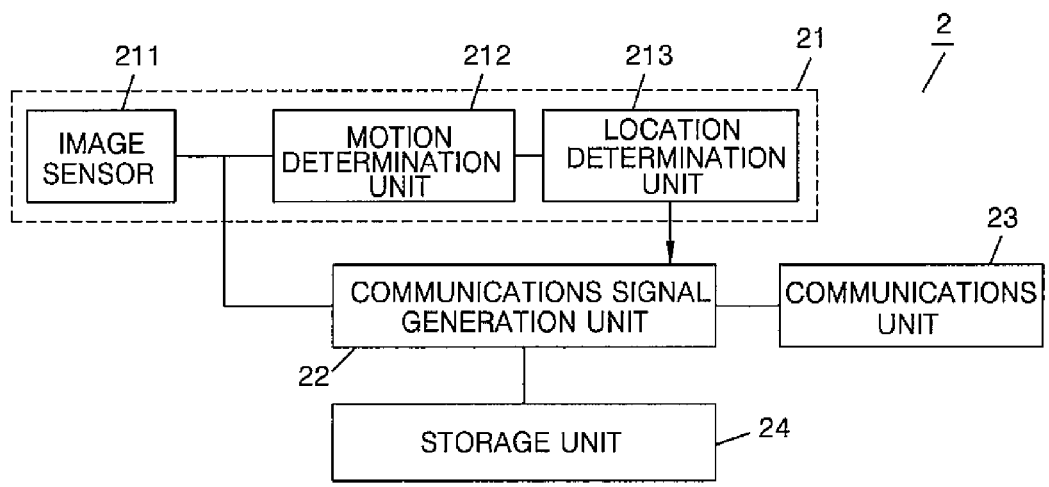
FIG. 2B is a block diagram showing an illumination control terminal forming a part of the illumination control system.

FIG. 2B is a block diagram showing the illumination control terminal 2, wherein the illumination control terminal 2 includes a sensor unit 21, a communications signal generation unit 22, the communications unit 23, and a storage unit 24 as principal components.

The sensor unit 21 includes an image sensor 211, a motion determination unit 212, and a location determination unit 213. The sensor unit 21 has a function of detecting the presence or absence of the person inside 4 and determining the location of the detected person inside 4 from an image.

The image sensor 211 includes an imaging device (not shown) such as a CMOS sensor. The image sensor 211 converts analog signals outputted from the imaging device into digital signals to form image data (a captured image) and outputs the image data to the motion determination unit 212. The image sensor 211 sets an entire indoor area in which the illumination control system S is installed as an imaging area. The image sensor 211 captures an image of the imaging area in response to a request from the motion determination unit 212, and outputs generated image data to the motion determination unit 212. Further, the image sensor 211 in the present embodiment captures the image of the imaging area about every 1/30 seconds, and then outputs the image data to the motion determination unit 212.

The motion determination unit 212 and the location determination unit 213 are implemented by using, e.g., a processor such as a DSP or the like. The motion determination unit 212 detects the motion of the person inside 4, and the location determination unit 213 specifies the location of the person inside 4 in an image in which the motion of the person inside 4 took place. Further, the operations of the motion determination unit 212 and the location determination unit 213 will be described later.

The communications unit 23 has a function of performing one-to-one communications with the communications unit 13 in each illumination apparatus 1 via the communications line L1. Further, the communications unit 23 is of course not limited to wired communications using the communications line L1 and may use power line communications or wireless communications as long as each illumination apparatus 1 and the illumination control terminal 2 can perform one-to-one communications with each other.

The storage unit 24 is implemented as, e.g., a non-volatile device such as an EEPROM, a flash ROM or the like. The storage unit 24 stores unique addresses allocated to the respective illumination apparatuses 1 and illumination areas (segmented areas) A to F (see FIGS. 5A and 5B) of the captured image which will be described later so that the unique addresses and the illumination areas correspond to each other.

The communications signal generation unit 22 is implemented by using, e.g., a processor such as a microcomputer, a DSP or the like and obtains an address of an illumination apparatus 1 corresponding to coordinates on the image transmitted from the location determination unit 213 from both information on the coordinates and the information stored in the storage unit 24. Further, the communications signal generation unit 22 generates a communications signal including both the address and a control signal required for dimming control of the illumination apparatus 1 and transmits the communications signal from the communications unit 23 to each illumination apparatus 1.

Meanwhile, in each illumination apparatus 1, when the communications signal is received via the communications unit 13, the dimming signal generation unit 11 compares the address included in the communications signal with its own address and generates a dimming signal based on the control signal included in the communications signal when the two addresses are identical to each other.

Further, the dimming signal generation unit 11 outputs the dimming signal to the illumination lighting unit 12, and the illumination lighting unit 12 turns on the light source 15 at a dimming level corresponding to the dimming signal. Furthermore, if the two addresses are not identical, the dimming signal generation unit 11 discards the communications signal.

Here, FIG. 1B is a layout diagram showing the illumination apparatuses 1A to 1F and the illumination control terminal 2 forming the illumination control system S, wherein six illumination apparatuses 1A to 1F are arranged at regular intervals around the illumination control terminal 2. "c" in FIG. 1B denotes the illumination range of each illumination apparatus 1. In the present embodiment, the illumination ranges c of neighboring illumination apparatuses 1 overlap with each other so that a non-illumination area is not present. Further, in FIG. 1B, only the illumination ranges c of the illumination apparatuses 1A to 1C are shown, but, in practice, uniform illumination ranges c are set for all of the illumination apparatuses 1A to 1F.

Figure 3A:
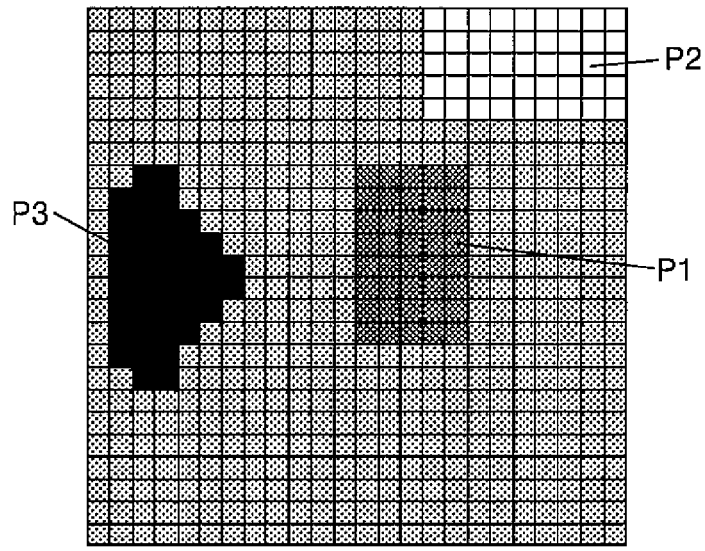
FIGS. 3A to 3C are diagrams for describing a differential image used in the illumination control system.

Next, the operation of the motion determination unit 212 forming a part of the sensor unit 21 in the illumination control terminal 2 will be described with reference to FIGS. 3A to 3C. The motion determination unit 212 receives image data transmitted from the image sensor 211 about every 1/30 seconds, stores image data at a specific time point (a time point before the person 4 enters an indoor space), as image data indicative of a background image, in a storage unit (not shown), and detects an object that enters the indoor space by comparing the background image with image data transmitted from the image sensor 211 at each time.

Figure 3B:
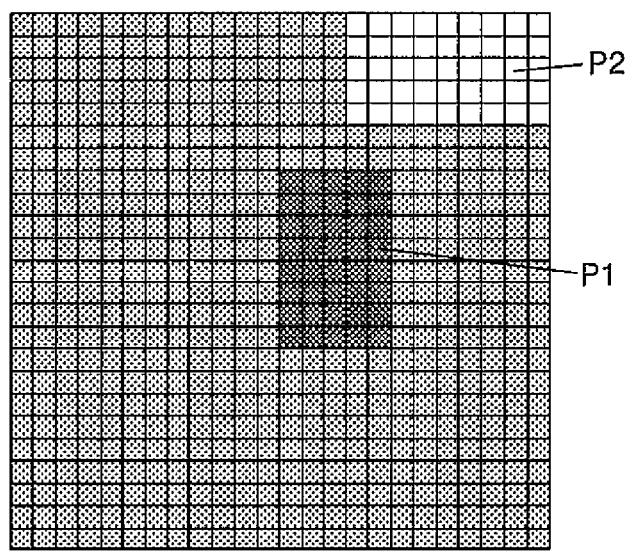
Figure 3C:
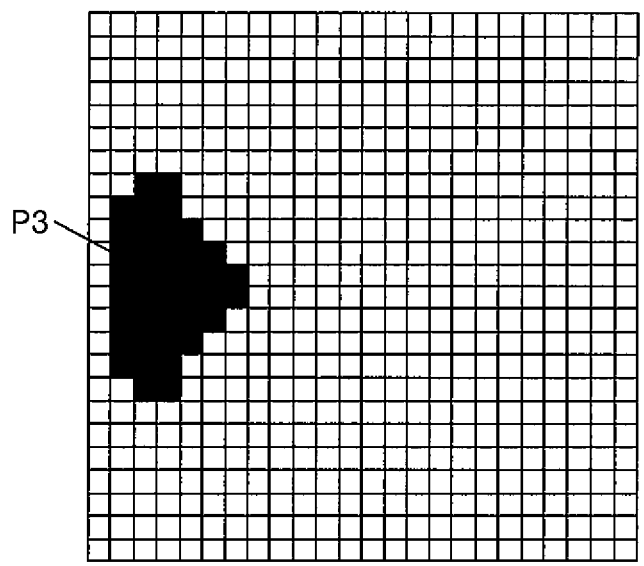

FIG. 3B illustrates image data indicating the background image at the specific time point, wherein the image data includes pixel groups P1 and P2 corresponding to a desk and the like. Further, FIG. 3A illustrates current image data transmitted from the image sensor 211, wherein the current image data includes pixel groups P1 and P2 corresponding to the desk and the like, and a pixel group P3 corresponding to the person inside 4. Furthermore, each difference between the corresponding pixels of the current image data and the image data indicative of the background image is binarized. Then, a luminance signal value for pixels having no change (including pixel groups P1 and P2) between the current image data and the image data indicative of the background image becomes 0, and the pixel group P3 having a change due to the person inside 4 has a certain luminance signal value. In this way, an image (differential image) obtained by binarizing the differences in image data between the current image and the background image is shown in FIG. 3C.

Finally, when the number of pixels included in the pixel group P3 or the size of the pixel group P3 exceeds a preset threshold, the motion determination unit 212 determines that the entering object is the person inside 4, and thereafter the subsequent location determination unit 213 determines the location of the person inside 4.

In this case, as methods of obtaining image data indicative of the background image, there is a method of sequentially taking the current image data as a background image and updating the background image with it over time, or a method of obtaining, at specific timing, image data in an environment in which no person inside 4 is definitely present and normally using this image data as a background image. However, in the case where the latter image data is assumed to be a background image, even a stationary object is detected when the stationary object other than the person inside 4 enters the indoor space, so that the illumination apparatus 1 is continuously turned on even if no person inside 4 is present. Therefore, it is preferable to update the image data indicative of the background image over time and process stationary objects other than the person inside 4 as a background.

Next, the operation of the location determination unit 213 forming a part of the sensor unit 21 in the illumination control terminal 2 will be described with reference to FIG. 4. When the person inside 4 is detected by the motion determination unit 212, the location determination unit 213 obtains coordinates (x, y) in the pixel group P3 included in the differential image outputted from the motion determination unit 212 and stores the coordinates in a storage unit (not shown). For example, when an image captured by the image sensor 211 is a VGA (Video Graphics Array) image, the coordinates may be defined as values corresponding to pixels such as (0, 0) to (639, 479). Further, it is preferable to use, as the coordinates of the pixel group P3, the center coordinates of a detected object (in the present embodiment, the person inside 4).

Figure 4:
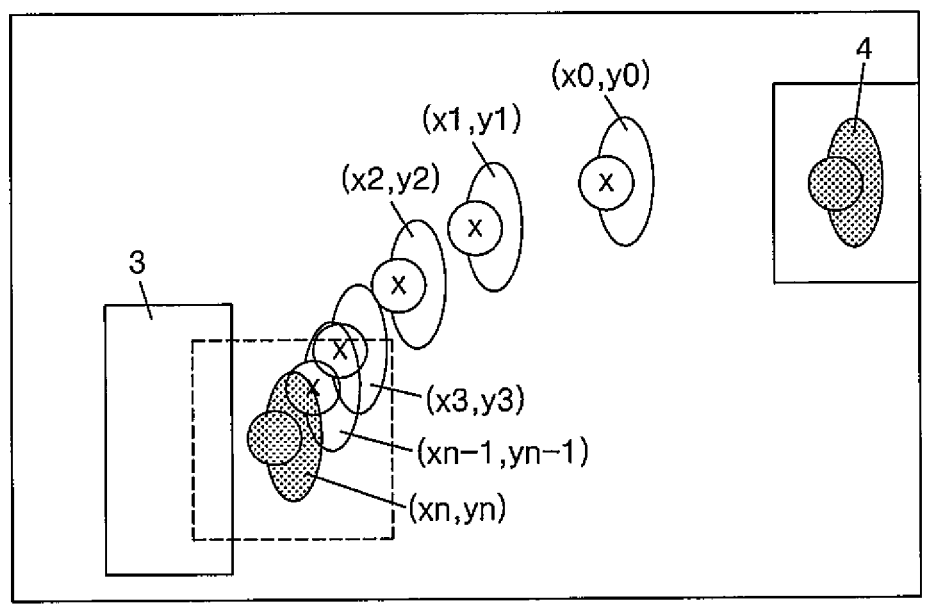
FIG. 4 is a diagram illustrating an operation for detecting a location of a person inside in the illumination control system.

In the embodiment shown in FIG. 4, if it is assumed that the coordinates of a location from which the person inside 4 starts to move are $(x_0, y_0)$, the coordinates vary in the sequence of $(x_1, y_1), (x_2, y_2), (x_3, y_3), \ldots, (x_{n-1}, y_{n-1})$ in a direction towards a desk 3. The coordinates of the person inside 4 when the person inside 4 arrives at the desk 3 become $(x_n, y_n)$. In this case, when the motion is large, the variation between the coordinates becomes large, whereas when the motion is small, the variation between coordinates becomes small. Accordingly, when the variation between the coordinates of frames (captured images) for a preset period of time is equal to or less than a predetermined value, it is determined that the person inside 4 is stopping, and the coordinates at that time are stored as location coordinates.

The illumination control terminal 2 in accordance with the present embodiment segments the image captured by the image sensor 211 into a plurality of (e.g., six in FIG. 5A) illumination areas (segmented areas) A to F so that the illumination areas respectively correspond to the illumination ranges c of the illumination apparatuses 1A to 1F. Therefore, when the illumination ranges c of the respective illumination apparatuses 1A to 1F overlap with one another, the illumination areas A to F are respectively included in the illumination ranges c of the respective illumination apparatuses 1A to 1F corresponding thereto, as shown in FIG. 5B. Further, in the present embodiment, the address of the illumination apparatus 1A and the coordinate information of the illumination area A, . . . , the address of the illumination apparatus 1F and the coordinate information of the illumination area F, are individually stored in the storage unit 24 in a correspondence manner.

Next, the operation of the illumination control system S will be described with reference to FIGS. 1A and 1B, and FIGS. 5A and 5B. First, when there is no person inside 4 in an indoor space, all of the illumination apparatuses 1A to 1F are in a waiting state (a turned-off state or a low-output lighting state). When a person inside 4 is detected and the location thereof is determined by the sensor unit 21 in the illumination control terminal 2, the communications signal generation unit 22 obtains the address of the corresponding illumination apparatus 1 based on the determined location information and the information stored in the storage unit 24 and generates a communications signal including both the address and a control signal required for a dimming control of the illumination apparatus 1. For example, in the example shown in FIG. 5B, since the person inside 4 is present in the illumination area A, the communications signal includes the address of the illumination apparatus 1A. Further, the communications signal generation unit 22 transmits the communications signal from the communications unit 23 to the individual illumination apparatuses 1A to 1F.

Further, when the communications unit 13 of each of the illumination apparatuses 1A to 1F receives the communications signal, the dimming signal generation unit 11 compares the address included in the communications signal with the address set in the dimming signal generation unit 11 itself. As a result, when the two addresses are identical to each other, the dimming signal generation unit 11 accepts the control signal included in the communications signal and generates a dimming signal corresponding to the control signal. Further, when the dimming signal generation unit 11 outputs the dimming signal to the illumination lighting unit 12, the illumination lighting unit 12 turns on the light source 15 at a predetermined dimming level in response to the dimming signal. Meanwhile, when the two addresses are not identical to each other, the dimming signal generation unit 11 discards the communications signal and the light source 15 is maintained in a waiting state. For example, in the example shown in FIG. 5B, only the light source 15 of the illumination apparatus 1A is turned on at a predetermined dimming level, and the light sources 15 of the illumination apparatuses 1B to 1F are maintained in a waiting state.

Next, when the person inside 4 leaves the indoor space, the person inside 4 is of course not detected in any of the illumination areas A to F. Accordingly, the communications signal generation unit 22 transmits a control signal required to return the state of the illumination apparatus 1A to the waiting state together with the address of the illumination apparatus 1A. Further, in the illumination apparatus 1A, when a communications signal including the control signal is received, the dimming signal generation unit 11 generates a dimming signal required to return the state of the light source 15 to the waiting state in response to the control signal, and then the light source 15 returns to the waiting state in response to the dimming signal.

Figure 6A:
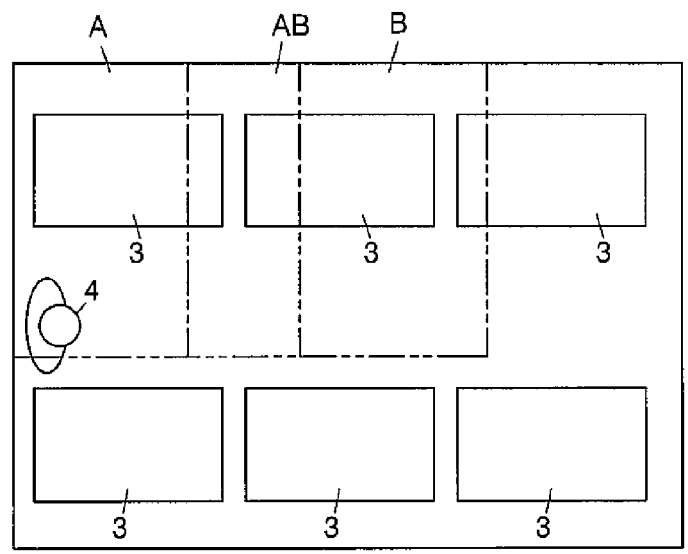
FIGS. 6A and 6B are diagrams illustrating the operation of the illumination control system.
Figure 6B:
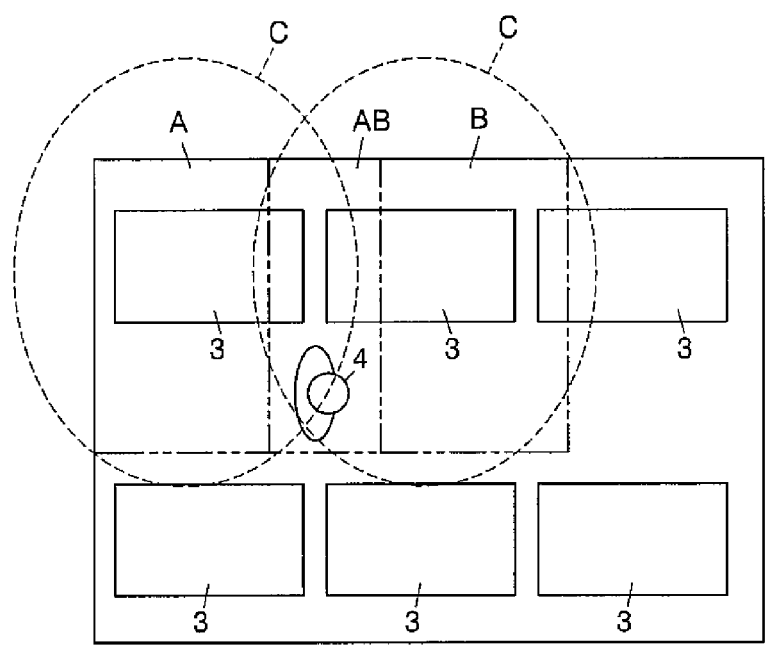

Further, as shown in FIGS. 6A and 6B, it is preferable that an overlapping area between the illumination ranges c of the neighboring illumination apparatuses 1A and 1B is set as an illumination area (an overlapping area) different from the above-described illumination areas (segmented areas) A to F. In the example shown in FIGS. 6A and 6B, an illumination area illuminated only by the illumination apparatus 1A is set to A, an illumination area illuminated only by the illumination apparatus 1B is set to B, and an illumination area (overlapping area) illuminated by both the illumination apparatuses 1A and 1B is set to AB. Further, when the person inside 4 is present in the illumination area AB, the communications signal generation unit 22 in the illumination control terminal 2 selects addresses corresponding to the illumination apparatuses 1A and 1B as addresses to be included in the communications signal and transmits the addresses, together with the control signal required to dimmingly turn on the light source 15, through the communications unit 23 to the individual illumination apparatuses 1A to 1F.

Meanwhile, since the communications signal transmitted from the illumination control terminal 2 includes the addresses of the illumination apparatuses 1A and 1B, the communications signal is discarded in the illumination apparatuses 1C to 1F, so that the light sources 15 thereof are maintained in the waiting state. Further, in the illumination apparatuses 1A and 1B, the light sources 15 thereof are turned on at a predetermined dimming level in response to the control signal included in the communications signal.

Further, as shown in FIGS. 6A and 6B, although an overlapping area between the illumination ranges c formed by the two illumination apparatuses 1A and 1B (i.e., the illumination area AB in FIGS. 6A and 6B) has been described, six illumination apparatuses 1A to 1F are installed in practice, so that similarly to the above case, overlapping areas between the illumination ranges c formed by the illumination apparatuses 1A to 1F are set as illumination areas different from those of the illumination areas (segmented areas) A to F.

Furthermore, it may be possible to provide, in the illumination control terminal 2, a function of measuring the illuminance distributions in an image captured by the image sensor 211 with respect to the illumination areas (segmented areas) A to F and to feedback-control the respective illumination apparatuses 1A to 1F so that the average illuminances of the illumination apparatuses 1A to 1F become same as respective preset target values.

For example, in the embodiment shown in FIG. 5B, the light source 15 is turned on at a predetermined dimming level for the illumination area A, while the illumination apparatuses 1B to 1F are feedback-controlled so that the average illuminances of the illumination apparatuses 1B to 1F become same as respective preset target values for the remaining illumination areas B to F. Further, the above target values may be set as dimming levels lower than the predetermined dimming level that has been set for an illumination area in which a person inside 4 has been detected, and the target values may be either different values or the same value, for respective illumination areas A to F.

In accordance with the present embodiment, when a person inside 4 is detected in an image captured by the image sensor 211, a segmented area (the illumination area A in the example of FIG. 5B) in which the person inside 4 is present is determined, and only the determined segmented area is used as a target of which brightness is detected. Therefore, an illumination environment in which an illuminance is controlled to a specific level with high-precision can be provided to the person inside 4 present in the segmented area. Further, for the remaining segmented areas, the corresponding illumination apparatuses 1 are turned off or turned on with a low output, thus contributing to energy savings.

Further, as shown in FIG. 6B, when a person inside 4 is located in illumination area AB in which the illumination ranges c of the neighboring illumination apparatuses 1A and 1B overlap with each other, the illumination apparatuses 1A and 1B are dimmingly turned on together, so that an illumination environment with a sufficient illuminance can be provided for the illumination area AB. Further, as shown in FIG. 5B, with respect to the remaining illumination areas B to F other than illumination area A in which the person inside 4 has been detected, the respective illumination apparatuses 1B to 1F are feedback-controlled so that the measured average illuminances become same as the respective preset target values, thus enabling dimming control to be performed at illuminance levels preset for the respective illumination areas B to F. Furthermore, the timing at which dimming control of each of the illumination apparatuses 1A to 1F is performed may be given in various manners; however, from the standpoint of energy savings, great effects can be expected when dimming control is performed depending on whether a person inside 4 is present or not.

When a plurality of persons inside 4 are present in any of illumination areas A to F, an illumination environment suitable for the work of the persons inside 4 can be provided to all of the persons inside 4 by performing a control such that brightness becomes uniform based on a person inside 4 being at a location having the lowest brightness. Further, when a plurality of persons inside 4 is present in any of illumination areas A to F, an illumination environment in which a balance between guaranteeing illumination for each of the persons inside 4 and energy savings is abided by can be provided by taking the average of surrounding brightness indices of respective persons inside 4. Further, the working range of each person inside 4 can be more limitedly specified by specifying an illumination area in which the person inside 4 is present by using the sensor unit 21 and thereafter continuously specifying the location of the person inside 4, and as a result, a more preferable illumination environment can be provided.

Further, the number of illumination apparatuses 1 is not limited by the present embodiment, and it is preferable to use two or more illumination apparatuses. Further, it is preferable to suitably set the number of segments of the image captured by the image sensor 211 in conformity with the number of illumination apparatuses 1.

Hereinafter a second embodiment of the illumination control system in accordance with the present invention will be described with reference to FIGS. 7A to 7F. The configuration of the illumination control system in the present embodiment is common to that of the first embodiment, so that the same reference numbers are assigned to common portions and a detailed description thereof is omitted.

An illumination control terminal 2 in accordance with the present embodiment is provided with an illumination area recognition mode in which respective illumination areas of illumination apparatuses 1A to 1F in a captured image are automatically recognized. Further, it is preferable for illumination area recognition mode to be executed in a state in which there is no person inside 4 and there is no external light being incident, e.g., in the nighttime. This will be described in detail below.

The illumination control terminal 2 is set to the illumination area recognition mode by using a signal outputted from, e.g., a timer (not shown) as a trigger signal and controls all of the illumination apparatuses 1A to 1F to be in a same operation state.

Figure 7A:
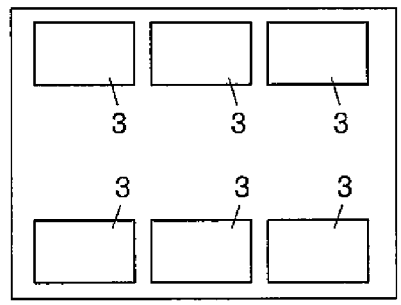
FIGS. 7A to 7F are diagrams illustrating an illumination area recognition mode in accordance with a second embodiment of the present invention.
Figure 7D:
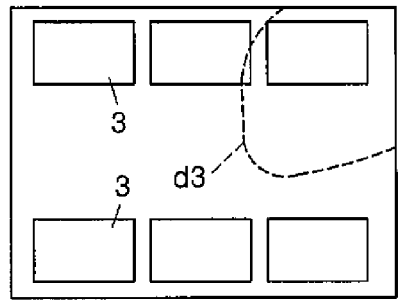

For example, the illumination control terminal 2 turns off all of the illumination apparatuses 1A to 1F by transmitting a turn-off signal to them, and primarily stores an image captured at this time by the image sensor 211 as a reference image in the storage unit 24 (FIG. 7A).

Figure 7B:
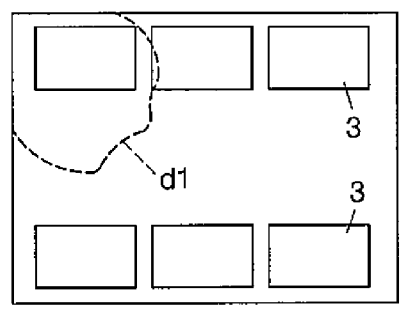
Figure 7E:
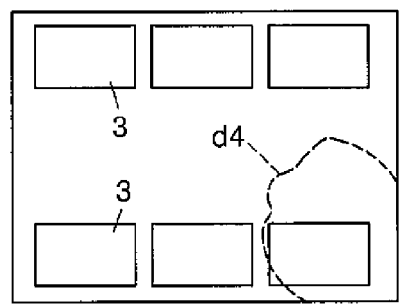
Figure 7C:
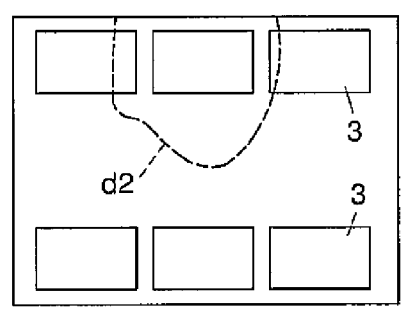

Next, the illumination control terminal 2 controls the illumination apparatuses 1A to 1F so that they are sequentially changed into different operating states one by one to obtain an image captured at each time by the image sensor 211 as a comparison image. First, the illumination control terminal 2 obtains a comparison image by turning on the illumination apparatus 1A, e.g., with the highest light output, compares the comparison image with the reference image and stores a pixel group, having a difference of a preset value or more between the images, in the storage unit in such a way that the pixel group corresponds to the address of the illumination apparatus 1A (FIG. 7B). For example, d1 in FIG. 7B denotes the illumination area of the illumination apparatus 1A in the captured image.

Next, the illumination control terminal 2 obtains a comparison image by turning off the illumination apparatus 1A and turning on the illumination apparatus 1B and stores a pixel group that can be obtained by comparing the comparison image with the reference image in the storage unit 24 so that the pixel group corresponds to the address of the illumination apparatus 1B, in the same manner. For example, d2 in FIG. 7C denotes the illumination area of the illumination apparatus 1B in the captured image.

Figure 7F:
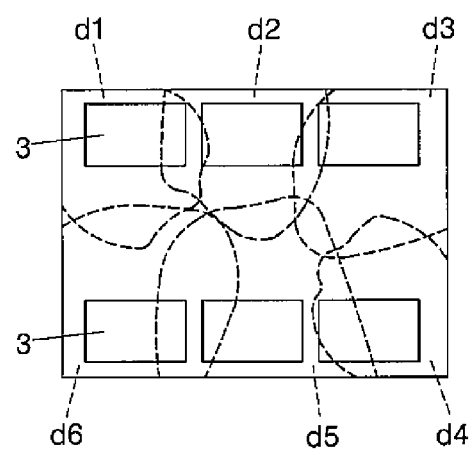

Below, in the same manner, the same processing is performed on each of the remaining illumination apparatuses 1C to 1F, so that an area image as shown in FIG. 7F can be obtained. Further, d3 in FIG. 7D denotes the illumination area of the illumination apparatus 1C in the captured image, land d4 in FIG. 7E denotes the illumination area of the illumination apparatus 1D in the captured image. Furthermore, d5 in FIG. 7F denotes the illumination area of the illumination apparatus 1E in the captured image, and d6 in FIG. 7F denotes the illumination area of the illumination apparatus 1F in the captured image. Furthermore, once the illumination areas d1 to d6 of all of the illumination apparatuses 1A to 1F have been stored in the storage unit 24, the illumination control terminal 2 completes the illumination area recognition mode and returns to a normal mode.

In this way, in accordance with the illumination control terminal 2 of the present embodiment, a data table indicating relationships between the respective illumination apparatuses 1A to 1F and the illumination areas d1 to d6 in the captured image can be automatically created under the installation environment.

Figure 5A:
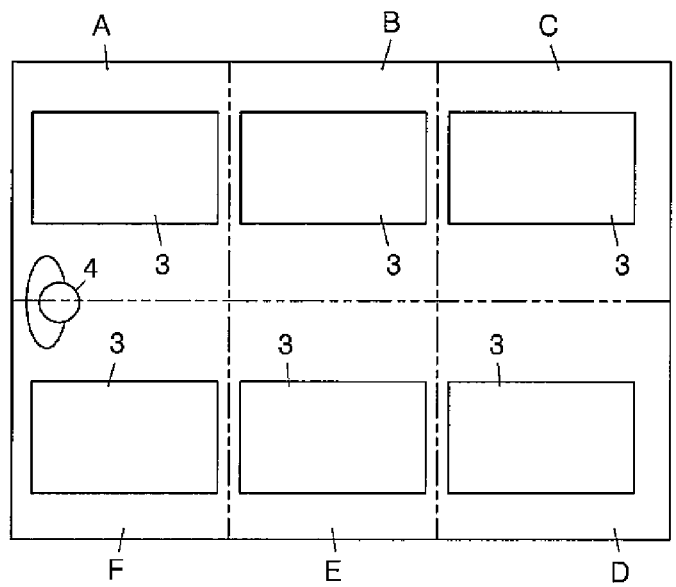
FIGS. 5A and 5B are diagrams illustrating the operation of the illumination control system.
Figure 5B:
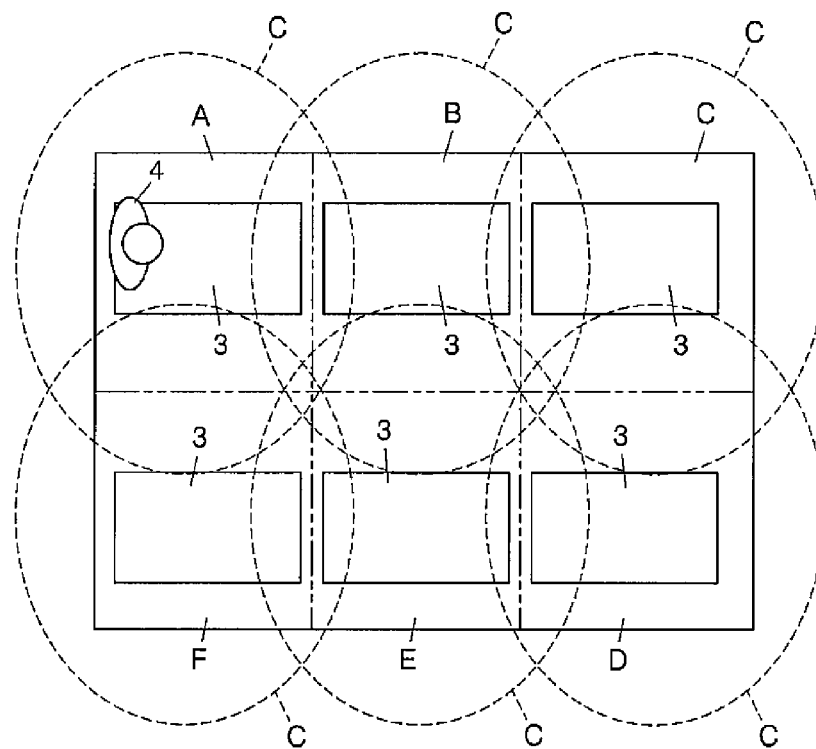

The illumination areas d1 to d6 set in the illumination area recognition mode may correspond to illumination areas A to F in FIGS. 5A and 5B, so that the operation of the illumination control system S described in the first embodiment can be performed.

Even in this case, as described in the first embodiment, areas in which illumination ranges of neighboring illumination apparatuses overlap with each other are set to illumination areas (overlapping areas) different from the illumination areas d1 to d6. When a person inside is present in the corresponding illumination area, the light sources of the neighboring illumination apparatuses can be turned on at predetermined dimming levels under the control of the dimming control terminal 2.

Further, similarly to the first embodiment, the function of measuring the illuminance distributions of an image captured by the image sensor 211 with respect to the illumination ranges d1 to d6 is provided in the illumination control terminal 2. The average illuminances of the remaining illumination areas other than an illumination area in which a person inside has been detected are calculated, and the illumination apparatuses of the corresponding illumination ranges can be feedback-controlled so that their own average illuminances can become same as respective preset target values.

Furthermore, in the present embodiment, in the above-described illumination area recognition mode, when a reference image is obtained, all illumination apparatuses 1A to 1F are turned off. However, the illumination apparatuses may be turned on at the lowest power, or they may be turned on at a predetermined dimming level. In these cases, when a comparison image is obtained, each illumination apparatus 1 may be turned off, or may be turned on at a different dimming level. Accordingly, the illumination area of each illumination apparatus 1 can be automatically recognized. In the present embodiment, by way of example, a signal from a timer (not shown) has been described as the trigger signal given upon making a transition to illumination area recognition mode. However, e.g., a signal outputted in accordance with a manipulation of a switch by a person may be used as the trigger signal, and is not especially limited by the present embodiment.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An illumination control system comprising:
a plurality of illumination apparatuses which have respective unique addresses and individually perform a dimming control in response to a dimming signal inputted from an outside, and an illumination control terminal which has an imaging device, a capturing range of which is set to include illumination ranges of the illumination apparatuses,
wherein the illumination control terminal segments an image captured by the imaging device into a plurality of areas so that the areas correspond to the illumination ranges of the respective illumination apparatuses, determines based on the captured image whether a person is present or not, determines a segmented area in which the person is present if the person has been detected and performs dimming control on an illumination apparatus corresponding to the determined segmented area.

2. The illumination control system of claim 1, wherein the illumination control terminal sets an area, in which the illumination ranges of the plurality of illumination apparatuses overlap with each other, as an overlapping area different from the segmented areas.

3. The illumination control system of claim 1, wherein the illumination control terminal has a function of measuring illuminance distributions in the captured image with respect to the segmented areas, and is configured to, if a person has been detected, calculate respective average illuminances of remaining segmented areas other than the segmented area where the corresponding person is present and perform a feedback-control on the corresponding illumination apparatuses so that the average illuminances become same as respective preset target values.

4. The illumination control system of claim 2, wherein the illumination control terminal has a function of measuring illuminance distributions in the captured image with respect to the segmented areas, and is configured to, if a person has been detected, calculate respective average illuminances of remaining segmented areas other than the segmented area where the corresponding person is present and perform a feedback-control on the corresponding illumination apparatuses so that the average illuminances become same as respective preset target values.

5. An illumination control system comprising:
a plurality of illumination apparatuses which have respective unique addresses and individually perform a dimming control in response to a dimming signal inputted from an outside, and an illumination control terminal which has an imaging device, a capturing range of which is set to include illumination ranges of the illumination apparatuses and which detects based on an image captured by the imaging device whether a person is present and performs a dimming control on an illumination apparatus corresponding to a location of a detected person if the person has been detected,
wherein the illumination control terminal has an illumination area recognition mode that is set in response to a trigger signal inputted from the outside and is configured to, if the illumination control terminal is set to the illumination area recognition mode, obtain a reference image by putting all of the illumination apparatuses in an identical operating state, obtain comparison images by sequentially switching an operating state of each of the plurality of illumination apparatuses to a different operating state one by one and compare the comparison images with the reference image, thus recognizing illumination areas of the respective illumination apparatuses.

6. The illumination control system of claim 5, wherein the illumination control terminal is configured such that, for an illumination area in which the illumination ranges of the plurality of illumination apparatuses overlap with each other, relevant illumination apparatuses are set to correspond to the illumination area.

* * * * *